C. FOSTER.
Corn-Planter.

No. 46,344.

Patented Feb. 14, 1865.

Witnesses:
Henry Morris
J. W. Coombs.

Inventor:
Clinton Foster
per Munn & Co.
attys.

UNITED STATES PATENT OFFICE.

CLINTON FOSTER, OF PRAIRIE CITY, ILLINOIS.

IMPROVEMENT IN SEEDING-MACHINES.

Specification forming part of Letters Patent No. 46,344, dated February 14, 1865.

*To all whom it may concern:*

Be it known that I, CLINTON FOSTER, of Prairie City, in the county of McDonough and State of Illinois, have invented a new and Improved Seeding-Machine; and I do hereby declare that the following is a full, clear, and exact description of the same, reference being had to the accompanying drawings, making a part of this specification, in which—

Figure 1:
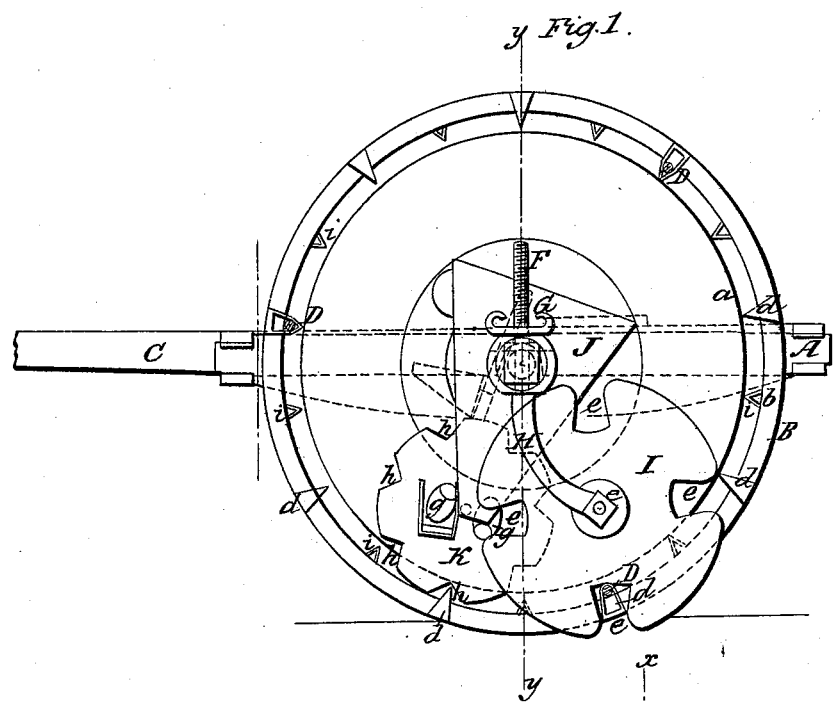
Figure 2:
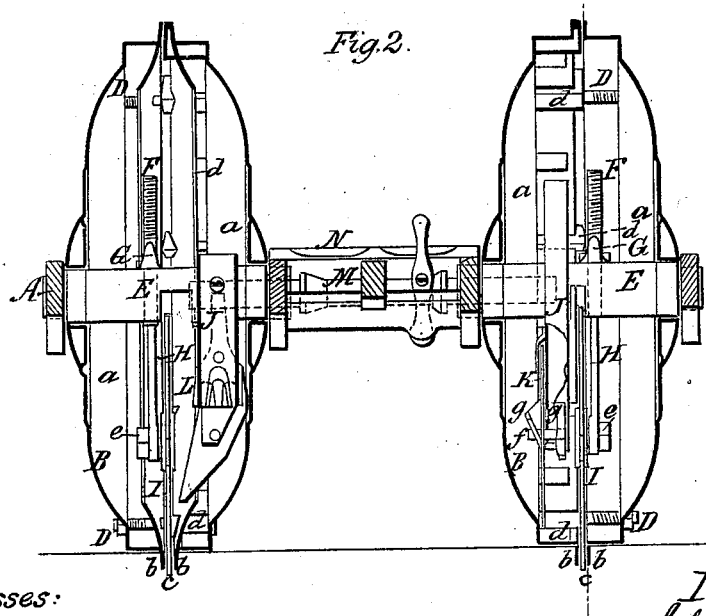

Figure 1 is a side sectional view of my invention, taken in the line $x\,x$, Fig. 2; Fig. 2, a transverse sectional view of the same, taken in the line $y\,y$, Fig. 1.

Similar letters of reference indicate corresponding parts in the two figures.

This invention consists in placing the seed-boxes and seed-distributing devices within the wheels of the machine and pressing the seed into the earth by means of circular rotating disks, which are also placed within the wheels and operated from the latter, all being arranged in such a manner as to form a very simple and efficient device for planting seed either in hills or drills.

To enable those skilled in the art to fully understand and construct my invention, I will proceed to describe it.

The wheels B B are each constructed of two equal parts, $a\,a$, connected together by screw-bolts D. These parts $a\,a$ may be constructed of sheet-metal swaged or cast in dish form, and with a flange, $b$, at their edge $a$, a space, $c$, being allowed between the flanges $b$ of each wheel, as shown clearly in Fig. 2. On the inner surface of the periphery of each wheel B there are projections, $d$, formed or placed at equal distances apart, as shown clearly in Fig. 1. The wheels B are placed loosely on fixed independent axles E E, and through each axle E a screw, F, passes vertically, having a thumb-nut, G, upon it. The lower end of each screw has a curved bar, H, attached to it, and to the lower ends of these bars H circular disks I are attached by pivots or bolts $e$, on which the disks are allowed to rotate freely. The disks I project down through the spaces $c$, between the flanges $b\,b$ of the parts $a\,a$ of the wheels B, and they may be made to project down a greater or less distance by turning the thumb-nuts G.

The disks I are provided with notches $e$ at equal distances apart, and these notches receive the projections $d$ of the wheel B. By this arrangement it will be seen that as the machine is drawn along the disks I within the wheels B will be rotated from the latter.

In each of the wheels B there is placed a seed-box, J. These seed-boxes are attached to the axles E, and have a fixed position, and they are provided with seed-distributing devices arranged so as to plant the seed either in hills or drills.

The device which plants the seed in drills is shown in the left-hand wheel B, and it consists in having a circular disk, K, fitted on an axis, $f$, at the lower end of the seed-box, said disk being in close contact with one side of the latter, and having two tubes, $g\,g$, attached to it at opposite sides of its center and in reverse positions. The disk K is notched at its periphery, as shown at $h$ in Fig. 1, and these notches receive projections $i$, and also receive the projections $d$, which are at the inner side of the periphery of the wheel B, as shown clearly in Fig. 1. By this arrangement it will be seen that the disk K as well as the disk I are rotated from the wheel B, in which they are placed, and as said disk is rotated the tubes $g\,g$ will alternately receive the seed from the lower end of the seed-box J, an opening, $j$, being made in its side for that purpose, (see Fig. 2,) and the seed will drop through the space $c$ between the two parts $a\,a$ of the wheel and into the furrow made by the flanges $b$ of the wheel and directly in front of the disk I, the latter pressing the seed into the earth at a greater or less distance, according to the height it may be adjusted. Thus the seed-box and seed-dropping arrangement are both inclosed within the wheels B, and one part $a$ of the latter is removed by unscrewing the bolts D whenever the mode of dropping is changed. When the seed-boxes require to be filled the grain is passed through the doors in the sides of the wheels B B. In the right-hand wheel B the seed-box J is provided with a vibrating slide, L, which has two cavities for dropping the seed in hills, which slide is operated by a rod, M, that passes into the open end of the axle E, and is attached to the upper end of the vibrating slide L, the rod M being moved by an attendant on the seat N on the frame A.

Various plans might be devised for dropping the seed in hills. Many of those in common use may be modified or arranged so as to be fitted within the wheels B, and the hill or the drill planting device may be used as desired, as they can be quickly adjusted in a working position within the wheels, and also quickly removed therefrom.

Having thus described my invention, what I claim as new, and desire to secure by Letters Patent, is—

1. The main wheels B B, which revolve upon the hollow fixed axles, with the flanges $b$, that open the furrows to receive the seed through the open spaces $c$ between the flanges $b$ $b$.

2. The hollow axles E E, in combination with the sliding rod M, screw-shafts F, and circular disks I, all arranged to operate substantially as and for the purpose specified.

3. The circular disks I, in combination with the wheels B, the latter being provided with spaces $c$ and the former provided with notches $e$, all arranged substantially as and for the purpose set forth.

CLINTON FOSTER.

Witnesses:
 E. M. L. BRINKERHOFF,
 S. S. STEARNS.